United States Patent [19]

König et al.

[11] Patent Number: 5,563,208

[45] Date of Patent: Oct. 8, 1996

[54] AQUEOUS BINDER MIXTURE AND USE THEREOF

[75] Inventors: Eberhard König, Leverkusen; Josef Pedain, Köln, both of Germany

[73] Assignee: Bayer Aktiengesellschaft, Leverkusen, Germany

[21] Appl. No.: 463,526

[22] Filed: Jun. 5, 1995

Related U.S. Application Data

[63] Continuation of Ser. No. 347,418, filed as PCT/EP93/01253, May 19, 1993, abandoned.

[30] Foreign Application Priority Data

Jun. 2, 1992 [DE] Germany ............... 42 18 184.4

[51] Int. Cl.$^6$ ............... C08J 3/00; C08K 3/20; C08L 75/00; B05D 3/02
[52] U.S. Cl. ............ 524/591; 524/839; 524/840; 427/372.2; 427/385.5; 427/384; 427/388.4
[58] Field of Search ............... 524/839, 840, 524/591; 427/384, 388.4, 385.5, 372.2

[56] References Cited

U.S. PATENT DOCUMENTS

| | | | |
|---|---|---|---|
| 4,387,181 | 6/1983 | Brown et al. | 524/591 |
| 4,501,852 | 2/1985 | Markusch et al. | 524/591 |
| 4,554,188 | 11/1985 | Holubka et al. | 427/393.5 |
| 4,678,835 | 7/1987 | Chang et al. | 525/100 |
| 5,047,294 | 9/1991 | Schwab et al. | 428/432.1 |

*Primary Examiner*—Paul R. Michl
*Assistant Examiner*—Patrick Niland
*Attorney, Agent, or Firm*—Joseph C. Gil; Thomas W. Roy

[57] ABSTRACT

An aqueous binder mixture comprising substantially an aqueous solution and/or dispersion of a combination of a) at least one NCO prepolymer which is soluble and/or dispersible in water in the presence of component b), exhibits urethane groups and has blocked isocyanate groups, and b) a polyamine component comprising at least one (cyclo)aliphatic polyamine having at least 2 primary and/or secondary amino groups, and the use of the aqueous binder mixture for the preparation of coatings on heat-resistant substrates.

8 Claims, No Drawings

AQUEOUS BINDER MIXTURE AND USE THEREOF

This application is a continuation of application Ser. No 08/347,418, filed AS pct/ep93/01253, mAY 19, 1993, now abandoned.

The invention relates to an aqueous binder mixture comprising substantially an aqueous solution and/or dispersion of a combination of a NCO prepolymer which is soluble and/or dispersible in water, having blocked isocyanate groups, and a polyamine component having primary and/or secondary (cyclo)aliphatically bonded amino groups, and the use of this binder mixture for the preparation of coatings on heat-resistant substrates.

The preparation of aqueous PUR dispersions is known and is described for example in the review article by J. W. Rosthauser and K. Nachtkamp "Waterborne polyurethanes" in Advances in Urethanes Science and Technology, Vol. 10, 1987, pp. 121 to 162. The mention here of mixing aqueous PUR dispersions with melamine formaldehyde resins prior to application is prior art, as discussed for example in U.S. Pat. No. 4,308,184. This measure imparts to the thermally cured coating film a cross-linked duromeric character and resistance to water and solvents. This cross-linking method has the disadvantage, apart from the problems involved in handling substances which release formaldehyde, that PUR dispersions which have been modified in such a manner have a limited pot life and thus do not represent a one-pot system.

Genuine one-pot polyurethane-based aqueous binders, i.e. having virtually unlimited stability in storage, are also already known (DE-OS 3 345 448). These are constituted by mixtures of two aqueous PUR dispersions, one containing OH groups and the other NCO groups blocked with ε-caprolactam. The disadvantage of these aqueous one-pot binders lies in the necessity for very high temperatures—approximately 170° C.—for the thermal cross-linking.

The object of the invention therefore comprises provision of aqueous binder mixtures which are stable in storage at room temperature, which are curable at comparatively low cross-linking temperatures within the range 120° to 150° C., and which can be utilised for the preparation of high-performance coatings in terms of the properties required in lacquer technology.

It was possible to achieve this object by preparing the aqueous binder mixture according to the invention which is described in greater detail below.

The object of the invention is an aqueous binder mixture comprising substantially an aqueous solution and/or. dispersion of a combination of a) at least one urethane group-exhibiting NCO prepolymer, having blocked isocyanate groups, which is soluble and/or dispersible in water in the presence of component b), and b) a polyamine component, comprising at least one organic polyamine having in total at least two primary and/or secondary, aliphatically or cycloaliphatically bonded, amino groups in a molar ratio of blocked isocyanate groups to primary and/or secondary amino groups of from 1:0.9 to 1:1.5.

A further object of the invention is the use of this aqueous binder mixture, optionally mixed with conventional auxiliary substances and additives taken from lacquer technology, for the preparation of coatings on heat-resistant substrates.

The binder component a) according to the invention is constituted by urethane group-exhibiting, hydrophilically modified NCO prepolymers having blocked isocyanate groups, and being soluble and/or dispersible in water at least in the presence of component b).

NCO prepolymers which are especially highly suitable as component a) are those which exhibit per molecule, at least two blocked isocyanate groups, at a blocked isocyanate group content (calculated as NCO) of from 2 to 10, and preferably from 3 to 6 wt-%, a content of from 5 to 20, and preferably from 8 to 15 wt-%, of ethylene oxide units (calculated as $C_2H_4O$) incorporated within polyether chains in the end and/or side position, and a content of from 10 to 60, and preferably from 15 to 40, milliequivalents of carboxyl groups which are at least partially neutralised by reacting with component b), per 100 g solids, wherein the total content of ethylene oxide units of the type named and carboxyl or carboxylate groups must be calculated in such a manner that the prepolymers are soluble and/or dispersible in water at least in the presence of component b).

Preferably, in terms of ionic modification, only incorporation of carboxyl groups which are at least partially neutralised in aqueous phase to strongly hydrophilic carboxylate groups by reciprocal action with the polyamines b), takes place during preparation of the prepolymers a), so that the solubility or dispersibility, respectively, of the component a) in water may be dependent on the simultaneous presence of component b), but need not be so if, in fact, component a) is of a sufficiently hydrophilic character to ensure the solubility or dispersibility, respectively, of component a) in water even in the absence of component b).

1) organic polyisocyanates, 2) higher molecular weight polyhydroxyl compounds, optionally 3) low molecular weight chain extenders, 4) hydrophilic structural components and 5) blocking agent for isocyanate groups are utilised for the preparation of the NCO prepolymers a).

Suitable polyisocyanates 1) are the known aromatic or (cyclo)aliphatic polyisocanates, such as are described, for example, in Houben-Weyl, Methoden der organischen Chemie [organic chemistry methods], Vol. 14/2, pp. 61 to 70, and in the article by W. Siefken in Justus Liebigs Annalert der Chemie 562, pp. 75 to 136. The following compounds may be named as examples of aromatic polyisocyanates: 2,4-diisocyanatotoluene, industrial mixtures of this with up to 35 wt-% of 2,6-diisocyanatotoluene, calculated on the mixture, 4,4'-diisocyanatodiphenylmethane, industrial mixtures of this with up to 50, and preferably up to 40 wt-% of 2,4' diisocyanatodiphenylmethane, calculated on the mixture, and optionally up to 5 wt-% of 2,2'-diisocyanatodiphenylmethane, calculated on the mixture, mixtures of the named diisocyanatodiphenylmethane isomers with their higher homologues exhibiting more than 2 isocyanate groups, wherein these mixtures generally exhibit at least 80 wt-% of the named diisocyanatodiphenylmethane isomers, and any mixtures of the polyisocyanates named by way of example. The following may be named as examples of aliphatic polyisocyanates: hexamethylene diisocyanate (HDI), 2-methylpentamethylene diisocyanate, 2,2,4-trimethylhexamethylene diisocyanate (THDI), isophorone diisocyanate (IPDI), 1,4-diisocyanatomethyl cyclohexane, tetramethylxylylene diisocyanate (TMXDI). The known "lacquer polyisocyanates", in particular those based on HDI and/or IPDI, in particular the known biuret groups, isocyanurate groups and/or uretdione group-exhibiting derivatives of these diisocyanates may also be utilised as starting component 1) for the preparation of the blocked polyisocyanates a). Any mixtures of the polyisocyanates named by way of example may also be used.

The polyhydroxyl compounds 2) are constituted in particular by those polyester polyols and/or polyether polyols, known per se from polyurethane chemistry, which exhibit per molecule at least 2, and preferably from 2 to 4, hydroxyl groups and a molecular weight of from 400 to 10,000, and preferably from 500 to 3,000, calculable from OH content and OH functionality. Either corresponding polyester polyols or mixtures of polyester polyols and polyether polyols are preferably used.

Suitable polyester polyols are also polyactone diols, for example reaction products of hexanediol-1,6 with ε-caprolactone, in particular within the molecular weight range 500 to 1,500.

Polyester polyols which are also suitable are polycarbonate diols, in particular hexanediol-1,6 polycarbonate diols within the molecular weight range 500 to 2,000, such as are obtainable by condensation of diols, in particular 1,6-hexanediol, with diphenyl carbonate or dimethyl carbonate in a manner which is known per se.

A portion of the polyester polyols may also comprise difficultly-saponifiable oligo-esters of long-chain, hydroxyl group-containing carboxylic acid. Castor oil should be named as an example.

The polyhydroxy polyethers are constituted by the products, which are known per se, of polyaddition reactions between epoxides, for example ethylene oxide and/or propylene oxide, and low molecular weight polyols of the type already named above as examples of starting material in the context of the polyester polyol. Those polyether polyols which correspond to the molecular weight data indicated and which are prepared by propoxylation of bisphenol A or trimethylolpropane in a manner which is known per se, are especially preferred.

The optionally co-utilised chain extenders 3) are constituted by either simple low molecular weight polyols of a molecular weight below 400, such as the multivalent, preferably bivalent, alcohols named as examples of starting materials in the context of the preparation of the polyester polyols, and/or by amino group-exhibiting compounds such as hydrazine or hydrazine hydrate or organic aliamines within the molecular weight range 60 to 400, such as ethylenediamine, hexamethylenediamine, 4,4'-diamino-dicyclohexylmethane or 3,3'-dimethyl-4,4'-diamino-dicyclohexylmethane. The low molecular weight chain extenders 3) are utilised in quantities of up to 10 wt-%, calculated on the weight of the higher molecular weight hydroxyl compounds 2), if they are utilised at all.

Suitable hydrophilic structural components 4) are monovalent, ethylene oxide unit-exhibiting polyether alcohols, in particular within the molecular weight range 350 to 5,000, such as are obtainable by addition of ethylene oxide and optionally other alkylene oxides to monofunctional starter molecules, for example methanol, n-propanol, n-butanol or butyldiglycol, in a manner which is known per se. In the event that other alkylene oxides such as propylene oxide are also utilised in this alkoxylation reaction, in addition to ethylene oxide, care must be taken to ensure that the proportion of ethylene oxide, calculated on the total quantity of alkylene oxides, is at least 40, and preferably at least 80 wt-%. In the event of more than one alkylene oxide being utilised, the latter may be utilised in a mixture and/or in succession for the alkoxylation reaction.

Further hydrophilic structural components 4) are organic carboxylic acids which exhibit in addition to the carboxyl groups at least one, and prefeably two, reactive groups which exhibit a greater readiness to react with isocyanate groups than that exhibited by carboxyl groups. These reactive groups are preferably constituted by primary and/or secondary amino groups and in particular alcoholic hydroxyl groups. Hydrophilic structural components of this type that are particularly highly suitable are α-α-dimethylolalkane carboxylic acids having in total from 5 to 8 carbon atoms, in particular dimethylolpropionic acid. Also suitable are, for example, hydroxypivalic acid or products of addition reactions between aliamines (e.g. ethylenediamine or isophorone diamine) and acrylic acid in accordance with DE-OS 2 034 479.

Both ethylene oxide unit-exhibiting monovalent alcohols of the type named by way of example and also amino- or hydroxycarboxylic acids of the named type are preferably utilised in the preparation of the prepolymers a) in quantities such that ethylene oxide units and carboxyl groups (or, after combination with component b), at least some carboxylate groups) are present in the prepolymers within the aforementioned ranges. The hydrophilic polyether chains are situated in the end position or (if branching-acting higher-functional structural components are co-utilised) on the side, because monovalent polyether alcohols which exhibit ethylene oxide units are used as a part of component 4).

Phenols, such as phenol, lactams, such as ε-caprolactam, oximes, such as butanone oxime and secondary amines, such as diisopropylamine, imidazole, pyrazole or 1,2,4-triazole may be utilised as blocking agent 5). Butanone oxime and diisopropylamine are preferred according to the invention.

The higher molecular weight polyhydroxyl compounds 2) are generally utilised in a quantity of from 20 to 60, and preferably from 30 to 55 wt-%, calculated on the total weight of starting components 1) to 5), for the preparation of the prepolymers a). The equivalent ratio of component 1) isocyanate groups to groups of components 2) to 4) which are reactive vis-à-vis isocyanate groups (not including the carboxyl groups present in component 4)) is generally from 1.5:1 to 2.5:1. The quantity of blocking agent 5) is generally calculated in such a manner that at least 90%, and preferably 100%, of the isocyanate excess then still present reacts with the blocking agent. It is in principle possible, but is by no means preferred, to use a small excess of blocking agent, so that the NCO prepolymers initially still exhibit free isocyanate groups which then react off with the water or part of component b) during the dispersion stage.

Component b) which is essential to the invention is constituted by (cyclo)aliphatic polyamines having in total at least two primary and/or secondary amino groups within the molecular weight range 60 to 400, and preferably 100 to 250. Examples which may be named are ethylenediamine, hexamethylenediamine, diethylenetriamine, 4,4'-diaminodicyclohexylmethane, 1,4-diaminocyclohexane, 3,3,5-trimethyl-5-aminomethylcyclohexylamine (IPDA) or also perhydrated triaminodiphenylmethanes such as are utilised according to DE-OS 3 417 683 for the preparation of the corresponding cycloaliphatic triisocyanates. Any mixtures o such polyamines may also be used. 3,3'-dimethyl-4,4'-di-amino-dicyclohexylmethane is preferred, The polyamines b) are utilised in the preparation of the binder mixtures according to the invention in quantities such that the molar ratio of blocked isocyanate groups of component a) to primary and/or secondary amino groups of component b) is from 1:0.9 to 1:1.5, and preferably from 1:1 to 1:1.1.

The binder mixtures according to the invention may be prepared, for example, by bringing to reaction, stepwise or by way of a single-pot reaction, the starting polyisocyanates 1) and the starting components 2) to 5) at a temperature of from 60° to 110° C., until the theoretical NCO value of the reaction mixture (generally complete disappearance of free isocyanate groups) is reached. Component b) is then stirred in and dilution takes place with water to the desired solids content, which is generally from 35 to 55 wt-%. The reaction is generally started in the melt and a water-miscible solvent which is inert to isocyanate groups, and which can subsequently be removed by distillation, for example acetone, is added as required. The solvent which has been added may, if desired, be removed by distillation following admixture of the water of dispersion. The binder mixtures according to the invention are finally obtained in the form of an aqueous solution or dispersion.

The conventional auxiliary substances and additives taken from lacquer technology, for example pigments, flow promoters, UV stabilisers, antioxidants, fillers, thixotropic agents or plasticisers, may be admixed to the binder mixtures according to the invention. Ready-to-use aqueous coating agents which can be stored at room temperature for virtually unlimited periods and which cure at relatively low temperatures of from 120° to 150° C. to form lacquer films having excellent mechanical properties are obtained in this manner. Since the polyamines b) fulfil the dual function of hardener for the blocked NCO prepolymers and neutralising agent for the incorporated carboxyl groups in the coating agents according to the invention, there is during thermal curing no dissociation of tertiary amines, which would otherwise normally serve as the neutralising agents in the chemistry of aqueous polyurethane dispersions. The neutralising agent is instead incorporated in the lacquer film. It is for this reason that only relatively small quantities of volatile organics are released during the stoving operation.

The binder mixtures according to the invention are particularly preferred for the preparation of under-floor protective coatings and stone-chip resistant fillers for motor vehicles.

All percentages indicated in the following Examples are by weight.

EXAMPLE 1

50% dispersion of a binder mixture according to invention, based on an aromatic isocyanate component. Component a), which represents the reaction product of the first 6 starting substances named, contains 8.7 wt-% of ethylene oxide units incorporated within polyether chains in the end or side position, and 30.4 milliequivalents carboxyl groups per 100 g of solids.

| Formulation | |
|---|---|
| 323.0 g (0.380 Val) | of an adipic acid-hexanediol-1,6-neopentylglycol polyester of OH number 66, |
| 240.0 g (0.240 Val) | of a polyether polyol of OH number 56, prepared by propoxylation of trimethylolpropane, |
| 90.0 g (0.040 Val) | of a monovalent polyether polyolol of OH number 25 (dispersing agent), prepared by ethoxylation of n-butanol, |
| 42.0 g (0.626 Val) | of dimethylolpropionic acid, |
| 63.8 g (0.734 Val) | of butanone oxime, |
| 271.0 g (2.020 Val) | of a tube MDI type having a two-nucleus proportion of approx. 90 wt-%, approx. 10 wt-% of which represents 2,4'-diphenyl-methanediisocyanate and approx. 10 wt-% higher-nucleus proportions, |
| 96.0 g (0.800 Val) | NCO content approx. 31.3%, of bis-(4-amino-3-methyl-cyclohexyl)-methane, |
| 1126.0 g | of water (equivalent to 50% solids content) |
| 2251.8 g | binder dispersion viscosity at 23° C. approx. 1000 mPas |

Method

MDI is placed in approx. 500 ml of acetone at room temperature and the polyester, both polyethers in anhydrous form, dimethylolpropionic acid and butanone oxime are introduced consecutively with stirring. The reaction mixture is heated slowly—causing an exothermic reaction of MDI and butanone oxime—to a reflux temperature of approx. 65° C., and is reacted under reflux conditions for approx. 10 h. At the end of this reaction time only a small NCO band can generally still be observed in the IR spectrum. Where this is the case a further 10 ml of butanone oxime are added and retesting takes place after 30 minutes for any residual NCO content. When no further NCO is present, the diamine is stirred into the cooling formulation. Water is then added with vigorous stirring at approx. 45° C. A milky blue dispersion is formed which still, however, contains acetone. The latter is distilled off at approx. 45° C. under reduced pressure (final value approx. 150 mbar) over a period of approx. 4 hours. A milky blue, finely-particulate 50% dispersion is obtained, having a viscosity of approx. 1,000 mPas (at 23° C.).

Properties

This one-pot binder dispersion is stable in storage, for example no change during 6 months' storage at 50° C. The dispersion is coloured grey with pigment, and is then applied to test plates. After evaporation of the water and stoving at 120° C. (for 30 minutes) a film thickness of, for example, 364 μm is determined. Adhesion is good. The coating withstands 2 minutes and 40 seconds of bombardment with shot (Saablux test) without damage, an excellent score.

EXAMPLE 2

Binder mixture according to the invention, based on an aliphatic polyisocyanate. The NCO prepolymer a) forming the reaction product of the first 7 starting components named contains 13.7 wt-% of ethylene oxide units incorporated in polyether chains in the end or side positions, and 15.2 milliequivalents of carboxyl groups per 100 g solids.

| Formulation | |
|---|---|
| 336.0 g (0.3 Val) | of an adipic acid-butanediol-1,4-polyester of OH number 50, |
| 135.0 g (0.06 Val) | of dispersing agent according to Example 1, |
| 20.1 g (0.30 Val) | dimethylolpropionic acid, |
| 99.9 g (0.90 Val) | IPDI |
| 270.0 g (1.35 Val) | of an isocyanurate group-exhibiting polyisocyanate based on hexamethyl-diisocyanate (NCO content 21%) |
| 117.6 g (1.23 Val) | of butanone oxime, |
| 10.0 g (0.4 Val) | of hydrazine hydrate |
| 114.7 g (1.35 Val) | IPDA, |
| 1345.0 g | of water (equivalent to 45% solids content) |
| 2448.3 g | binder dispersion |

Method

Polyester and polyether are taken and are dewatered with stirring at a temperature of 110° C. and a pressure of 15 mbar for approx. 1 hour. Cooling takes place to approx. 60° C. and both isocyanate components and the dimethylolpropionic acid are stirred in, the former in one shot, the latter portionwise. Smallish portions of butanone oxime are then added, whereupon the reaction becomes exothermic. Heating takes place and reaction occurs in the melt at from 100° to 110° C., until just less than the calculated NCO content of 1.5% is reached after approx. 2 hours. Cooling takes place to approx. 70° C., followed by dissolution in approx. 1000 ml acetone and addition of the hydrazine hydrate to extend the chain length. Stirring of the acetone solution continues at approx. 50° C. for a further 3 hours, the IR spectrum indicates a minimal NCO band, mixed with IPDA and free of acetone, as already described in Example 1. A milky blue, finely particulate 45% dispersion is obtained having a viscosity of approx. 2,000 mPas at 23° C. This one-pot binder dispersion is stable in storage.

EXAMPLE 3

Binder mixture according to the invention, based on aliphatic polyisocyanates. The NCO prepolymer a) representing the reaction product of the first 7 starting components named contains 13.2 wt-% of ethylene oxide units incorporated within polyether chains in the end or side position and 27.9 milliequivalents of carboxyl groups per 100 g solids.

| Formulation | |
|---|---|
| 448.0 g (0.40 Val) | of an adipic acid-butanediol-1,4 polyester of OH number 50, |
| 180.0 g (0.08 Val) | of the dispersing agent according to Example 1, |
| 133.2 g (1.20 Val) | of IPDI, |
| 360.0 g (1.80 Val) | of polyisocyanate according to Example 2, |
| 26.8 g (0.40 Val) | of dimethylolpropionic acid, |
| 165.6 g (1.64 Val) | of diisopropylamine, |
| 120.0 g (0.4 Val) | of a product of an addition reaction between 1 mol IPDA (170 g) and 1 mol acrylic acid (72 g) in water (242 g); 1 Val of incorporatable NH/NH$_2$ in this aminocarboxylic acid equates to 300 g, |
| 153.0 g (1.8 Val) | of IPDA, |
| 1623.0 g | of water, equivalent to 45% solids content |
| 3209.6 g | binder dispersion |

Method

Polyester and polyether are dewatered with stirring at a temperature of 110° C. and a pressure of 15 mbar for approx. 1 hour. Cooling takes place to approx. 70° C. dilution takes place with 120 g N-methylpyrrolidone, the isocyanates are added in a single shot, the dimethylolpropionic acid is introduced portion-wise and diisopropylamine is added dropwise to the well-stirred formulation. The internal temperature is then increased to 100° C. After a reaction time of approx. 1 hour, an NCO content just below the calculated value of 1.45% is obtained. Cooling takes place to approx. 60° C., dilution follows with approx. 1,200 ml of acetone and the aqueous solution of the IPDA-acrylic acid addition product is stirred in. After approx. 30 minutes at 40° C. no further NCO content is detectable (IR spectrum) in the acetone solution. IPDA is added and dispersion with water follows. Acetone is then distilled off over a period of 4 hours, as indicated in Example 1 (45° C. at 150 mbar). A milky blue dispersion having a solids content of 50%, an organic solvent content of 3.7% and a viscosity at 23° C. of approx. 2,000 mPas is obtained.

We claim:
1. A process for the preparation of a coating which comprises applying to a substrate a coating composition containing as binder an aqueous binder composition comprising an aqueous solution and/or dispersion of
   a) one or more urethane group-containing NCO prepolymers which have blocked isocyanate groups and are soluble and/or dispersible in water in the presence of component b) and
   b) a polyamine component containing one or more organic polyamines having at least two primary and/or secondary, aliphatically or cycloaliphatically bound amino groups, in a molar ratio of blocked isocyanate groups to primary and secondary amino groups of 1:0.9 to 1:1.5, and curing the composition to form a coating.

2. The process of claim 1 wherein component a) has a blocked isocyanate group content (calculated as NCO) of 2 to 10 wt %, an ethylene oxide content (calculated as $C_2H_4O$) of 5 to 20 wt % incorporated within polyether chains in terminal and/or lateral positions and a content of 10 to 60 milliequivalents per 100 g solids of carboxyl groups which are at least partially neutralized by reaction with component b).

3. The process of claim 1 wherein said substrate is a motor vehicle substrate.

4. The process of claim 2 wherein said substrate is a motor vehicle substrate.

5. The process of claim 1 which comprises curing the composition at a temperature of 120° to 150° C.

6. The process of claim 2 which comprises curing the composition at a temperature of 120° to 150° C.

7. An aqueous binder composition comprising an aqueous solution and/or dispersion of
   a) one or more urethane group-containing NCO prepolymers, which have blocked isocyanate groups, are soluble and/or dispersible in water in the presence of component b) and are prepared from (cyclo)aliphatic polyisocyanates and
   b) a polyamine component containing one or more organic polyamines having at least two primary and/or secondary, aliphatically or cycloaliphatically bound amino groups in a molar ratio of blocked isocyanate groups to primary and secondary amino groups of 1:0.9 to 1:1.5.

8. The aqueous binder composition of claim 7 wherein component a) has a blocked isocyanate group content (calculated as NCO) of 2 to 10 wt %, an ethylene oxide content (calculated as $C_2H_4O$) of 5 to 20 wt % incorporated within polyether chains in terminal and/or lateral positions and a content of 10 to 60 milliequivalents per 100 g solids of carboxyl groups which are at least partially neutralized by reaction with component b).

* * * * *